United States Patent Office 3,810,955
Patented May 14, 1974

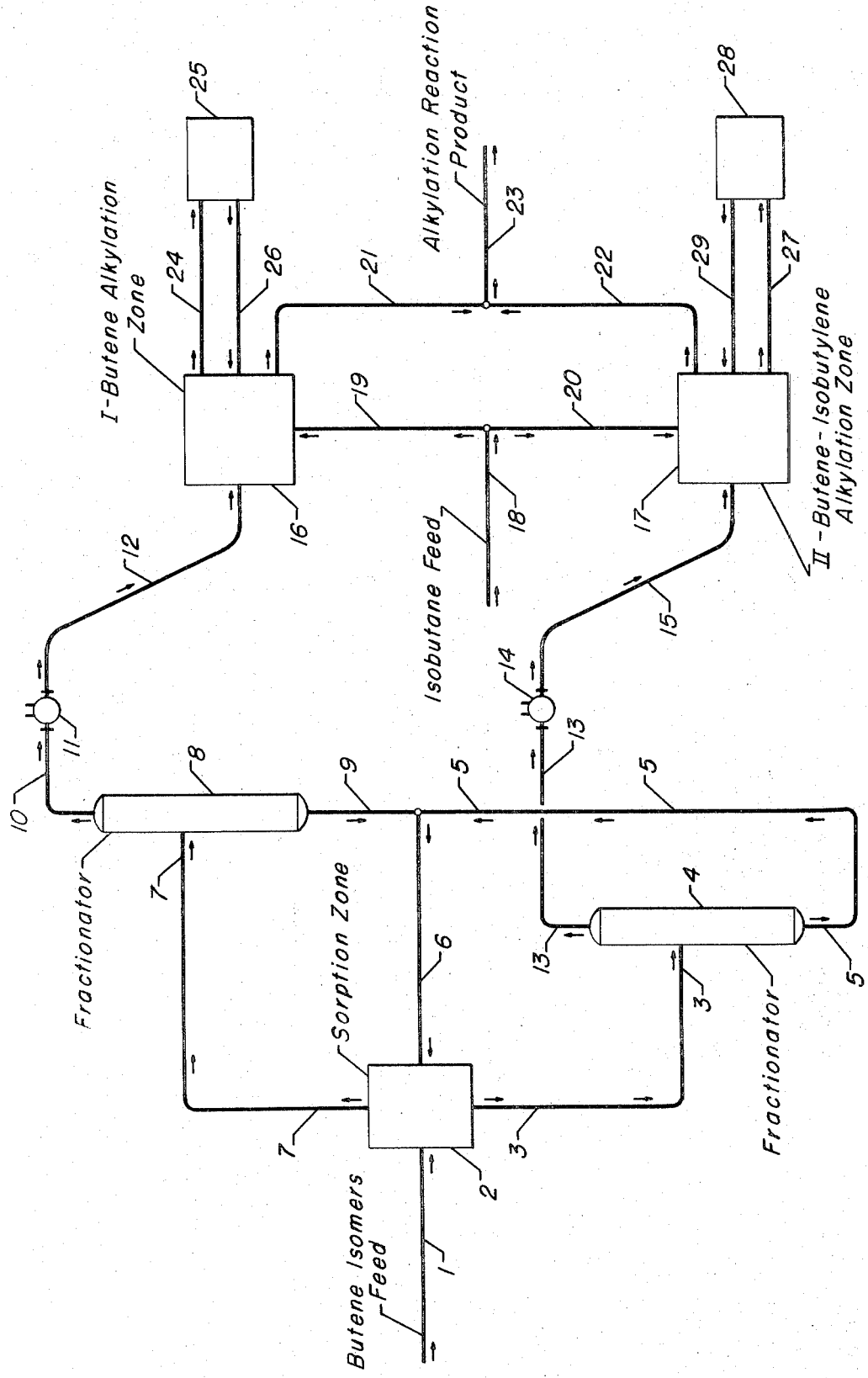

3,810,955
BUTENE SEPARATION AND ALKYLATION
Jay E. Sobel, Des Plaines, Ill., assignor to Universal Oil Products Company, Des Plaines, Ill.
Filed Dec. 1, 1971, Ser. No. 203,800
The portion of the term of the patent subsequent to Oct. 2, 1990, has been disclaimed
Int. Cl. C07c 3/54
U.S. Cl. 260—683.49                              6 Claims

ABSTRACT OF THE DISCLOSURE

A process for producing an alkylation reaction product from an isoparaffin and an olefinic reactant containing 1-butene, 2-butene and isobutylene by separating the reactant, using a crystalline aluminosilicate, to provide a 1-butene stream and a 1-butene-free stream and alkylating the 1-butene-free stream at 2-butene-isobutylene alkylation conditions. The 1-butene stream is separately alkylated at 1-butene alkylation conditions.

BACKGROUND

This invention relates to a process for producing an alkylation reaction product from an isoparaffinic reactant and an olefinic reactant containing 1-butene, 2-butene and isobutylene. In one aspect, this invention relates to the separation and alkylation of butene isomers. In another aspect, this invention relates to the alkylation of commingled 2-butene and isobutylene in the absence of 1-butene. More particularly, this invention relates to a process for producing an alkylation reaction product, having excellent properties as a motor fuel component, from an isoparaffinic reactant and a mixture of 1-butene, 2-butene and isobutylene by separating the mixture in a sorption zone to provide a 1-butene stream and a 2-butene-isobutylene stream; contacting at least a portion of the 2-butene-isobutylene stream with an alkylation catalyst in an alkylation zone; and recovering the alkylation reaction product from the effluent from the alkylation zone.

The use of catalytic alkylation processes to produce gasoline-boiling-range isoparaffins having valuable anti-knock properties and suitable as motor fuel blending components is well known in the petroleum refining art. Generally, the alkylation of isoparaffins with olefins is accomplished by contacting the reactants with an acid-acting catalyst such as hydrogen fluoride or sulfuric acid, settling the resulting mixture to separate the catalyst, and further separating hydrocarbons, for example by fractionation, to recover the product. The alkylation reaction product, normally a mixture of $C_6$–$C_{10}$ saturates, is called alkylate. Alkylate is typically a mixture of isomers of heptane, octane, etc., the composition depending upon the particular isoparaffinic and olefinic reactants utilized. In commercial alkylation processes, the isoparaffin employed is normally isobutane, while the olefinic reactant is usually a mixture of 1-butene, 2-butene and isobutylene or a mixture of the above butenes with amylenes and/or propylene. The more highly branched hydrocarbons such as trimethylpentanes are preferred products of alkylation processes rather than less branched hydrocarbons such as dimethylhexanes, because the more highly branched hydrocarbons provide a higher octane motor fuel.

It is well known in the art that crystalline aluminosilicates are useful for separating hydrocarbons. Particularly, some Type X and Type Y zeolites have been disclosed for use in the separation of olefins from paraffinic hydrocarbons and the separation of 1-butene from isobutylene (see U. S. Pat. 3,531,539, Class 260–677).

SUMMARY OF THE INVENTION

It is an object of this invention to provide an improved reaction product in an isoparaffin-olefin alkylation process. It is an object of this invention to provide an improved reaction product in an isoparaffin-olefin alkylation process. It is a further object of this invention to provide an economical method for separating and alkylating butene isomers.

In an embodiment, the present invention relates to a process for producing an alkylation reaction product from an isoparaffinic reactant and an olefinic reactant containing 1-butene, 2-butene and isobutylene, which process comprises the steps of: (a) separating said olefinic reactant to provide a 1-butene stream and a 2-butene-isobutylene stream; (b) contacting at least a portion of said 2-butene-isobutylene stream with said isoparaffinic reactant and with an alkylation catalyst in an alkylation zone at alkylation conditions; and (c) recovering said alkylation reaction product from the effluent from said alkylation zone.

In another embodiment, the present invention relates to the process for producing an alkylation reaction product from an isoparaffinic reactant and an olefinic reactant containing 1-butene, 2-butene and isobutylene, which process comprises the steps of: (a) separating said olefinic reactant to provide a 1-butene stream and a 2-butene-isobutylene stream; (b) contacting at least a portion of said 2-butene-isobutylene stream with a first portion of said isoparaffinic reactant and with a first alkylation catalyst in a first alkylation zone at 2-butene-isobutylene alkylation conditions; (c) contacting at least a portion of said 1-butene stream with a second portion of said isoparaffinic reactant and with a second alkylation catalyst in a second alkylation zone at 1-butene alkylation conditions; and, (d) recovering a first portion of said alkylation reaction product from the effluent from said first alkylation zone and recovering a second portion of said alkylation reaction product from the effluent from said second alkylation zone.

I have discovered that the alkylation of a mixture of 2-butene and isobutylene with an isoparaffin results in an alkylation reaction product which is superior to the alkylation reaction product obtained when 2-butene and isobutylene are alkylated separately and the resulting alkylation reaction products combined. Moreover, I have found that the synergistic effect of alkylating 2-butene and isobutylene together is further enhanced when the alkylation of the 2-butene-isobutylene mixture is undertaken in the absence of 1-butene and at specific alkylation conditions particular to the 2-butene isobutylene mixture. By separating 1-butene from the mixture of butene isomers normally utilized as the olefinic reactant in an isoparaffin-olefin alkylation process, and subsequently alkylating the resulting 2-butene-isobutylene mixture, an improved alkylation reaction product is recovered. The 1-butene which is separated from the conventional olefinic reactant is separately alkylated at specific alkylation conditions particular to the 1-butene reactant.

DESCRIPTION OF THE DRAWINGS

The attached drawing is a schematic representation of one embodiment of the present invention. Referring to the drawing, butene isomers feed, containing 1-butene, 2-butene and isobutylene is passed through conduit 1 into sorption zone 2. In sorption zone 2, the butene isomer feed is contacted with a Type X zeolite sorbent containing a barium cation at cationic sites within the zeolite. Sorption conditions in sorption zone 2 include a temperature of about 50° F.–150° F. and a pressure sufficient to maintain 1-butene, 2-butene and isobutylene in the liquid phase. 1-butene from the butene isomers feed is selectively adsorbed by the zeolite sorbent, leaving a raffinate comprising 2-butene and isobutylene in the void between particles of the sorbent. A purging stream of 20 vol. percent 1-octene and 80 vol. percent iso-octanes is charged to sorption zone 2 through conduit 6, and is utilized to purge the raffinate from sorption zone 2. The combined purging stream and raffinate of 2-butene and isobutylene are withdrawn from sorption zone 2 by way of conduit 3 and passed into fractionator 4. In fractionator 4, the raffinate is separated from the purging stream. A stream of 2-butene and isobutylene is recovered in the overhead vapor from fractionator 4 through conduit 13. 1-octene and iso-octanes are recovered in the bottoms from fractionator 4 and passed through conduit 5 to conduit 6 whereby the hydrocarbons are reintroduced into sorption zone 2. The stream of 20 vol. percent 1-octene and 80 vol. percent iso-octane from conduit 6 is utilized to desorb 1-butene from the zeolite sorbent to provide an extract stream. The extract stream, comprising 1-butene, 1-octene and iso-octanes, is withdrawn from sorption zone 2 through conduit 7, and charged to fractionator 8. In fractionator 8, 1-butene is separated in the overhead vapors and recovered through conduit 10. 1-octene and iso-octane are recovered in the bottoms from fractionator 8 and passed through conduit 9 to conduit 6 for further continuous use in purging and desorption as described. The 1-butene stream in conduit 10 is passed into cooler 11 and condensed and cooled therein to the temperature desired for alkylation at 1-butene alkylation conditions. The liquefied 1-butene is withdrawn from cooler and passed through conduit 12 to 1-butene alkylation zone 16. The vapor stream of 2-butene and isobutylene in conduit 13 is passed into cooler 14 and condensed and cooled therein to the temperature desired for alkylation at 2-butene-isobutylene alkylation conditions. A liquefied mixture of 2-butene and isobutylene is withdrawn from cooler 14 through conduit 15 and introduced into 2-butene-isobutylene alkylation zone 17. Isobutane feed is introduced into conduit 18 and divided into two portions, one of which is passed through conduit 19 into 1-butene alkylation zone 16, while the other portion is passed through conduit 20 into 2-butene-isobutylene alkylation zone 17. In 1-butene alkylation zone 16, the 1-butene stream from conduit 12 and the isobutane stream from conduit 19 are commingled, at a temperature of about 75° F. to about 125° F. and a pressure sufficient to maintain 1-butene and isobutylene in the liquid phase, and contacted with a hydrogen fluoride alkylation catalyst comprising about 1 wt. percent to about 5 wt. percent water, about 10 wt. percent to about 30 wt. percent catalyst-soluble hydrocarbons, and about 70 wt. percent to about 90 wt. percent hydrogen fluoride. Contact time between the reactants and catalyst is maintained at about 0.1 minute to about 20 minutes. The hydrocarbons are then separated from the catalyst and withdrawn from 1-butene alkylation zone 16 through conduit 21. In 2-butene-isobutylene alkylation zone 17, the 2-butene-isobutylene stream from conduit 15 and the isobutane stream from conduit 20 are commingled and contacted with a hydrogen fluoride alkylation catalyst comprising less than about 2 wt. percent water, less than about 10 wt. perecnt catalyst-soluble hydrocarbons and more than about 85 wt. percent hydrogen fluoride. The hydrocarbons and catalyst are contacted for about 0.1 minute to about 20 minutes. The hydrocarbons are then separated from the catalyst and withdrawn from 2-butene-isobutylene alkylation zone 17 through conduit 22. The hydrocarbon effluents from alkylation zones 16 and 17 flow through conduits 21 and 22 and are combined in conduit 23. The alkylate in the stream in conduit 23 may be recovered by further conventional processing, e.g. by fractionation, while any isobutane, olefins, etc., may be recycled to appropriate streams in the process scheme described hereby, if desired. Hydrogen fluoride catalyst from alkylation zone 16 is withdrawn and passed through conduit 24 to catalyst regeneration zone 25. The regenerated catalyst is returned to alkylation zone 16 through conduit 26. The amount of catalyst passed to regeneration zone 25 is that necessary to maintain the concentrations of catalyst components at a level appropriate for alkylation of isobutane with 1-butene. Similarly, hydrogen fluoride catalyst from alkylation zone 17 is withdrawn and passed through conduit 27 to catalyst regeneration zone 28. Regenerated catalyst is returned to alkylation zone 17 through conduit 29. Sufficient catalyst is regenerated in zone 28 to maintain the concentrations of catalyst components at a level appropriate for alkylation of isobutane with 2-butene and isobutylene.

Various conventional operations and equipment have not been shown in the drawing or mentioned in the foregoing description, including for example, pumps, heat exchangers, reboilers, etc. Such necessary, conventional equipment and its use in the process of the present invention will be obvious to one skilled in the art from the foregoing and from the detailed description of the preferred embodiments hereinafter provided.

DETAILED DESCRIPTION OF THE INVENTION

The olefinic reactant, which is separated in the present inventive process to provide a 1-butene stream and a 1-butene-free stream of 2-butene and isobutylene, may contain solely butene isomers or may contain other hydrocarbons. It is contemplated that the olefinic feed employed in a conventional isoparaffin-olefin alkylation process is suitable for use as the olefinic reactant in the present process, in that such a conventional feed typically comprises a mixture of 1-butene, 2-butene and isobutylene. However, other materials may be present in the olefinic reactant to be separated, such as paraffins, naphthenes, and aromatics, as well as sulfur-containing and/or nitrogen-containing contaminant compounds. A conventional olefinic reactant, which would typically be utilized as the olefinic feed to an isoparaffin-olefin alkylation process, might contain such other olefins as propylene or amylenes. Such an olefinic reactant is suitable for use in the process of the present invention. In addition, a suitable olefinic reactant may contain propane, normal butane, isobutane, pentanes, dienes, etc., which hydrocarbons are often present in minor amounts in a conventional olefinic reactant feed to an alkylation process. It is preferred that the olefinic reactant employed in the present inventive process contain at least about 15 vol. percent $C_4$ olefins. The term "1-butene reactant" is meant to include both substantially pure 1-butene as well as 1-butene combined with one or more of the above hydrocarbons, contaminants, etc., and is intended to include only 1-butene-containing streams substantially free from 2-butene and isobutylene. Similarly, the term "preferred butene isomers reactant" is meant to include substantially pure 2-butene or substantially pure isobutylene and any mixture thereof, as well as 2-butene, isobutylene or a mixture of both, combined with one or more of the above-mentioned hydrocarbons, contaminants, etc., and substantially free from 1-butene.

In order for the synergistic effect of alkylating an isopraffin with a mixture of 2-butene and isobutylene to be operative, it is essential that, at the least, there is a larger fraction of 2-butene than of 1-butene in the mixture. Hence, it is essential to the process of the present invention that a 2-butene-isobutylene stream to be employed in an alkylation reaction in this process have at least more 2-butene than 1-butene. Subject to the above limitation, it is also preferred that such a 2-butene-isobutylene stream contain at least less than about 10 vol. percent 1-butene, and preferably less than about 5 vol. percent 1-butene. The use of the term "substantially 1-butene-free" to describe a stream comprising 2-butene and isobutylene is intended to include 2-butene-isobutylene streams subject to the above limitations and, in addition, having less than about 3 vol. percent 1-butene therein. Similarly, the use of the term "substantially 1-butene-free" to modify the term "preferred butene isomers reactant," as the latter term is defined above, is intended to include, for example, a stream of 2-butene containing less than about 3 vol. percent 1-butene, a stream of isobutylene containing less than about 3 vol. percent 1-butene, as well as mixtures of 2-butene and isobutylene containing less than about 3 vol. percent 1-butene and having a larger fraction of 2-butene therein than 1-butene. The use of the term "substantially 1-butene-free" to describe a stream is not intended to exclude from that stream such other materials as, for example, paraffins, propylene, amylenes, naphthenes, aromatics, hexenes, heptenes, etc., as well as minor amounts of contaminants such as nitrogen- or sulfur-containing compounds.

The separation of 1-butene from 2-butene and isobutylene may be performed in any suitable manner within the scope of the present invention. The method herein described, utilizing a crystalline aluminosilicate sorbent, is preferred, and has definite and apparent advantages over fractionation and other known methods for separating 1-butene from 2-butene and isobutylene. The normal boiling point of 2-butene is from about 10° F. to about 14° F. above the normal boiling point of 1-butene, and the normal boiling point of isobutylene is about 2° F. below that of 1-butene. Therefore, separation of 1-butene from a mixture containing 2-butene and isobutylene by fractionation is extremely difficult. By using a solid sorbent such as certain crystalline aluminosilicates, such difficulties can be avoided. Among the sorbents which can be used in the process of this invention are those generally referred to as crystalline aluminosilicates or zeolites, including both the natural and synthetic aluminosilicates. Particular crystalline aluminosilicates which may be employed as the sorbent in the present invention include aluminosilicates having cage structures in which the alumina and silica tetrahedra are intimately connected in an open three-dimensional network. The zeolite structure comprises $AlO_4$ and $SiO_4$ tetrahedra which are cross-linked by the sharing of oxygen atoms, with spaces between the tetrahedra occupied by water molecules prior to partial or total dehydration of the zeolite. The dehydration of the zeolite results in crystals interlaced with the cells having molecular dimensions. The crystalline aluminosilicates are often referred to as molecular sieves when a separation to be performed using them is dependent essentially upon discrimination between molecular dimensions. In the present separation operation, the term "molecular sieves" is not suitable since the separation of butene isomers is dependent primarily on electrochemical attraction of different isomeric configurations rather than upon physical size differences in the isomeric molecules. In hydrated form, crystalline aluminosilicates may generally be represented by the formula in Equation 1 below:

$$M_{2/n}O:Al_2O_3:wSiO_2:yH_2O \qquad (1)$$

where "M" is a cation which balances the electrovalence of the tetrahedra and is generally referred to as an exchangeable cationic site, "n" represents the valence of the cation, "w" represents the moles of $SiO_2$, and "y" represents the moles of water. The cations may be any one of a number of cations which will hereinafter be described in detail.

Type X structured and Type Y structured zeolites, as the terms are used herein, include crystalline aluminosilicates having a three-dimensional interconnected cage structure and specifically defined by U.S. Pats. 2,888,244 and 3,130,007. The terms "Type X structured" and "Type Y structured" zeolites are intended to include all zeolites which have a general structure as represented in the above two cited patents and specifically include those structures containing various cations exchanged upon the zeolite. In the most limiting sense, these terms are intended to refer to Type X and Type Y zeolites. The Type X structured zeolites can be represented in terms of mole oxides as represented by the formula in Equation 2 below.

$$0.9\pm0.2M_{2/n}O:Al_2O_3:2.5\pm0.5SiO_2:yH_2O \qquad (2)$$

where "M" represents at least one cation having a valence of not more than 3, "n" represents the valence of "M," and "y" is a value up to about 9, depending upon the identity of "M" and the degree of hydration of the crystalline structure. The Type Y structured zeolites can be represented in terms of mole oxides for this sodium form as represented by the formula in Equation 3 below:

$$0.9\pm0.2Na_2O:Al_2O_3:wSiO_2:yH_2O \qquad (3)$$

where "w" is a value of greater than about 3 up to 8, and "y" may be any value up to about 9.

Sorbents which may be utilized in the present invention include not only the sodium form of Type Y zeolite, but also crystalline materials obtained from such a zeolite by partial or complete replacement of the sodium cation with other individual cations or groups of cations. Similarly, the Type X zeolite may also be ion-exchanged. Cationic or base exchange methods are generally known to those familiar with the field of crystalline aluminosilicate production. They generally include contacting a zeolite with an aqueous solution of salts of the cations to be exchanged onto the zeolite. After the desired degree of exchange takes place, the sieves are removed from the aqueous solution, washed, and dried to a desired water content. Cation exchange may be effected by using individual solutions of desired cations placed on the zeolite or by using an exchange solution containing a mixture of cations, where two or more cations are to be placed on the zeolite. In normal cation exchange operations, cations can be placed on the zeolite in any concentration ranging from about 1% to about 100% of the original cations present. From knowledge of the empirical formula, including the silica to alumina ratio of the zeolite used, its water content, e.g., Type X or Type Y structured, and the percentage of binder, if any, within the zeolite, it is possible to calculate the percentage of ion-exchange which has taken place. The percentage can be represented in terms of the weight percent of the zeolite which contains a cation when the atomic weight of the cation and its valence are determined. Cations are placed singly or in pairs upon the zeolite, the preferred cations may be present on the zeolite in high concentrations with various relatively small amounts of other cations present. It is preferred to reduce any non-preferred cation content to a level such that the cation does not function to substantially affect the selectivity of the sorbent for 1-butene. Cations which can be placed on the zeolite sorbent include the Group I-A, Group II-A, Group VIII and Group I-B metals of the Periodic Table of the Elements. Other cations not mentioned may be present in small quantities. For the purposes of the present process, cations to be used on the sorbent include cations selected from the above-mentioned groups with the limitation that the cation utilized is selective for 1-butene with respect to the other butene isomers. Of the above recited cations, potassium and barium are preferred and barium is especially preferred, since barium- and potassium-cation-containing zeolites selectively adsorb 1-butene over 2-butene and isobutylene.

The feed stock of olefinic reactant, comprising 1-butene, 2-butene and isobutylene, is broken down into two components, an extract material comprising 1-butene and a raffinate material comprising 2-butene and isobutylene. The extract material is the component of the feed stock which is selectively adsorbed by the sorbent. Raffinate material in the present process include the components ot the feed stock which are not selectively adsorbed by the sorbent, i.e., isobutylene and 2-butene, but may also include extraneous components mentioned above. The extract material may also contain, in some instances, small amounts of contaminants such as aromatics, or nitrogen- or sulfur-containing compounds. It is desirable to use a desorbent to remove the selectively adsorbed 1-butene from the sorbent. Basically, desorption includes passing either a gas or hydrocarbon material over the sorbent in the absence of at least most of the raffinate material and recovering an extract material by purging the extract material from the sorbent or replacing it by the desorbent. Specific desorbent materials which can be utilized in the present invention include higher molecular weight $C_5$–$C_{15}$ olefins such as 1-octene which are easily separated from 1-butene. Desorbents which contain mixtures of normal olefins and isoparaffins have been found to possess desired qualities with respect to desorbing 1-butene from the sorbent. In specific embodiments in which liquid phase operations are maintained, a preferred desorbent for 1-butene desorption is a mixture of 20 vol. percent 1-octene and 80 vol. percent iso-octane. Other normally liquid desorbent materials can also be used, for example, aromatic hydrocarbons or paraffins. Still other desorbent materials which are easily separated from 1-butene, are such gases as hydrogen, methane, or, in some instances, steam or air, all of which can be used to purge the extract material from the sorbent.

Sorption conditions include temperatures from ambient up to about 350° F. or higher. In some instances, 350° F. may be too high, since catalytic activity of the sorbent may cause dimerization of 1-butene. Pressures can be of any reasonable range from vacuum up to hundreds of atmospheres. Lower pressures and temperatures are preferred. It is preferred to maintain sorption conditions to provide liquid phase operation, although vapor phase operation may be utilized. Liquid phase operation includes the advanatge of lower temperatures at given pressures, and the selectivity of the sorbent is enhanced for 1-butene at the lower temperature. Sorption conditions also include passing the olefinic reactant feed stock over a sorbent material. The sorbent then selectively adsorbs 1-butene in the feed stock, while leaving raffinate material, comprising 2-butene and isobutylene, in interstitial void spaces between the sorbent particles. Included in the separation operation can be a purge step in which the raffinate material is either purged from the sorbent by another hydrocarbon material or by a gas, leaving the sorbent containing 1-butene at the selective sorptive sites within the sorbent particles. Sorption conditions for desorbing 1-butene include the pressure and temperature limitations described above in connection with adsorption operations. Additionally, sorption conditions for desorbing 1-butene include the passage of a desorbent material over the sorbent after the sorbent has been contacted with the feed stock and the raffinate of 2-butene and isobutylene withdrawn. Depending upon the separation scheme utilized, sorption conditions for desorbing 1-butene can include a gas purge at a higher temperature than utilized in adsorption combined with a reduced pressure. Using the above operations, 1-butene can easily be recovered from the adsorbent. Other sorption conditions can include the passage of a liquid desorbent material over the sorbent at conditions to effect the removal of 1-butene from the sorbent and replacement of the 1-butene on the sorbent by the desorbent material. The 1-butene is then recovered in admixture with the desorbent material, and is passed into a simple fractionating or separating means from which relatively pure 1-butene is recovered. Sorption conditions can include the removal of desorbent material from the sorbent by purging operations. In these instances, the material which is adsorbed on the sorbent can be removed by a gas purge or vacuum desorption. The sorbent can then be recontacted with the feed stock at sorption conditions appropriate for adsorbing 1-butene.

The various flow schemes for embodiment of a sorption zone which can be utilized to effect the separation step in the process of this invention include the relatively simple swing bed operations in which one or more sorbent beds are connected in the manner to allow adsorption and desorption operations to take place in each of the beds simultaneously, with the switching of feed stock and desorbent materials between the individual sorbent beds to effect the relatively continuous production of extract and raffinate materials. The separation step can also be effected using a single chamber through which alternate streams are passed. However, this method does not effect continuous production of 1-butene. Especially preferred schemes for the separation step are those generally referred to in the separation art as fixed bed countercurrent flow schemes in which a fixed bed and a rotary valve are operated to effect a simulated moving bed operation. The general concept of such a flow scheme is disclosed in U.S. Pat. 2,985,589. It is preferable to use olefinic reactant feed stocks which contain from about a few percent 1-butene and a few percent total olefins content up to essentially pure $C_4$ olefins. A specific olefinic reactant feed stock which can be utilized in the process of this invention contains about 35 vol. percent 1-butene, 32.5 vol. percent isobutylene and 32.5% 2-butene. Another suitable composition is a feed stock containing approximately 21 vol. percent 1-butene, 21 vol. percent isobutylene, 32 vol. percent 2-butene, with remaining feed stock components comprising paraffinic hydrocarbons.

When the olefinic reactant has been separated into a stream comprising 1-butene and a 1-butene-free stream comprising 2-butene and isobutylene, the mixture of 2-butene and isobutylene in the 1-butene-free stream is employed to alkylate an isoparaffin to provide an alkylation reaction product improved over that produced in previously disclosed alkylation processes. Suitable isoparaffinic reactants for use in the alkylation step of the present invention include isobutane, 2-methylbutane, 2-methylpentane, 3-methylpentane, 2,2-dimethylbutane, 2,3-dimethylbutane, and similar higher molecular weight isoparaffins, or mixtures of the foregoing. Isobutane is the preferred isoparaffinic reactant. The isobutane feed stock to a conventional isobutane-olefin alkylation process is suitable for use in the present process. Typically, such a conventional isobutane feed stock contains minor amounts of propane, normal butane, pentanes, olefins, etc., and such an isobutane feed stock is suitable for use in the present process. It is essential that the isoparaffinic reactant which is contacted with the mixture of 2-butene and isobutylene be substantially free from 1-butene, so that the synergistic effect of alkylating isobutane with 2-butene and isobutylene together is not impaired.

Various alkylation catalysts are known to be suitable for use in catalyzing the alkylation of an isoparaffin with an olefin. Examples of such catalysts which may be employed in the present inventive process include hydrogen fluoride, sulfuric acid, aluminum chloride, phosphoric acid, certain crystalline aluminosilicates, etc., with or without solid supporting materials such as alumina, silica, etc.

The alkylation catalyst preferred for use in the present invention is a hydrogen fluoride alkylation catalyst. I have found that the quality of the alkylation reaction product recovered from the alkylation of isobutane with a mixture of 2-butene and isobutylene is highest when the preferred catalyst contains particular concentrations of the various conventional catalyst components. Similarly, the highest quality reaction product recovered from the alkylation of isobutane with 1-butene is obtained when the preferred hydrogen fluoride catalyst contains particular concentrations, different from the optimum in 2-butene-isobutylene alkylation, of the components of the catalyst. Hydrogen fluoride alkylation catalyst typically contains more than about 70 wt. percent titratable hydrogen fluoride, with various concentrations of water and organic diluents, ranging between about 1–5 wt. percent for water and about 5–15 wt. percent for organic diluents. The term organic diluents is intended to cover catalyst-soluble hydrocarbons having a higher molecular weight than isobutane. A conventional hydrogen fluoride alkylation catalyst, having, in general, the concentration ranges indicated above, is sufficient for use as the alkylation catalyst in the present invention both for reactions involving 1-butene and for reactions involving a mixture of 2-butene and isobutylene. As stated, however, optimum results will be achieved by maintaining different, particular concentrations of catalyst components in the portions of catalyst employed to alkylate, on the one hand, 1-butene, and on the other, 2-butene and isobutylene. A preferred 2-butene-isobutylene hydrogen fluoride catalyst for use in the alkylation of isobutane with 2-butene and isobutylene at 2-butene-isobutylene alkylation conditions has a hydrogen fluoride concentration of greater than about 90 wt. percent and a preferably greater than about 95 wt. percent, a water content of less than about 2 wt. percent and preferably less than about 0.5 wt. percent, and an organic diluent content of less than about 10 wt. percent and preferably less than about 5 wt. percent. A preferred 1-butene hydrogen fluoride catalyst for use in the alkylation of isobutane with 1-butene at 1-butene alkylation conditions has a hydrogen fluoride content of about 60 wt. percent to about 90 wt. percent, preferably about 75 wt. percent to about 85 wt. percent, a water content of about 1 wt. percent to about 5 wt. percent, preferably about 1.5 wt. percent to about 3 wt. percent, and an organic diluent content of about 10 wt. percent to about 30 wt. percent, preferably about 15 wt. percent to about 25 wt. percent.

In general, alkylation conditions maintained in an alkylation zone in the process of this invention, including both an alkylation zone wherein isobutane is reacted with 1-butene and an alkylation zone wherein isobutane is reacted with 2-butene and isobutylene, comprise a temperature in the range from about 0° F. to about 200° F. and a pressure of about 1 atmosphere to about 40 atmospheres. A molar ratio of the isoparaffin employed to the olefin employed is maintained at about 2:1 up to about 20:1. The weight ratio of catalyst to hydrocarbons employed is between about 0.1:1 and about 10:1.

1-butene alkylation conditions preferably include a temperature of about 75° F. to about 125° F. and a pressure sufficient to maintain liquid phase operations in the preferred temperature range, e.g. a pressure of about 10 atmospheres to about 40 atmospheres. 1-butene alkylation conditions also include the use of the preferred 1-butene alkylation catalyst described above. A catalyst-hydrocarbons contact time of about 5 minutes to about 30 minutes is preferred under 1-butene alkylation conditions.

2-butene-isobutylene alkylation conditions preferably include a temperature of about 0° F. to about 70° F. and a pressure sufficient to maintain liquid phase operations in the alkylation zone. The preferred 2-butene-isobutylene alkylation catalyst described above is preferably employed, and a contact time between the catalyst and hydrocarbons is preferably maintained at about 0.1 minute to about 5 minutes.

TABLE I

| | Run number | | | | | |
|---|---|---|---|---|---|---|
| | 1 | 2 | 3 | 4 | 5 | 6 |
| Description | Mixed olefin feed | Separate olefin feed | Mixed olefin feed | Separate olefin feed | Separate olefin feed | Mixed olefin feed |
| Process conditions: | | | | | | |
| Reactor temp., °F | 68 | 68 | 68 | 68 | 68 | 68 |
| Isobutane/olefin mole ratio | 12 | 12 | 12 | 12 | 12 | 12 |
| Acid/hydrocarbons volume ratio | 1.5 | 1.5 | 1.5 | 1.5 | 1.5 | 1.5 |
| Catalyst analysis, wt. percent: | | | | | | |
| Water | 1.0 | 1.0 | 1.0 | 1.0 | 1.0 | 1.0 |
| Soluble hydrocarbons | 10 | 10 | 10 | 10 | 10 | 10 |
| Acidity | 89 | 89 | 89 | 89 | 89 | 89 |
| 1-butene in olefin feed, wt. percent | | | | | 50 | 50 |
| 2-butene in olefin feed, wt. percent | 50 | 50 | 25 | 25 | | |
| Isobutylene in olefin feed, wt. percent | 50 | 50 | 75 | 75 | 50 | 50 |
| Residence time, seconds | 600 | 600 | 600 | 600 | 600 | 600 |
| Alkylate properties: | | | | | | |
| Research octane number (clear) | 98.8 | 98.7 | 98.7 | 98.4 | 96.1 | 94.8 |
| Motor octane number (clear) | 96.6 | 96.2 | | | 94.1 | 93.1 |
| TMP/DMH, mole ratio | | | 15.0 | 13.5 | 5.4 | 3.5 |

An alkylation zone employed in an embodiment of the present invention may be any means which will suitably contain the alkylation reaction mixture of catalyst, reactants and alkylation reaction products at appropriate alkylation conditions. Various suitable alkylation vessels are known to prior art. The alkylation zone may comprise a continuous zone for mixing and separation of catalyst and hydrocarbon phases or may comprise distinct vessels with means for transferring alkylation reaction mixture to a separation vessel from a reaction vessel. A method for withdrawing heat from the alkylation zone should be included. For example, the heat generated in the alkylation reaction may be withdrawn directly from an alkylation zone by indirect heat exchange between cooling water and the reaction mixture. In another embodiment, the catalyst to be contacted with the reactants may be cooled beforehand to act as a heat sink in the alkylation reaction. Also suitable is a method for cooling the alkylation zone in which the hydrocarbons to be introduced to the alkylation zone are cooled to act as a heat sink in the alkylation zone. Means for separating the hydrocarbon phase from the catalyst phase are well known in the art of alkylation processes. Suitable separation means may be continuous with or distinct from the reaction zone employed in a particular embodiment. Conditions during a settling operation in the alkylation process are substantially the same as those alkylation conditions described below, with respect to temperature and pressure.

Examination of the data presented in Table I indicates that alkylation of isobutane with mixed 2-butene and isobutylene provides an alkylation reaction product having properties superior to that produced when isobutane is alkylated with the two olefins separately under the same process conditions and the alkylation reaction products are combined. In Run 1, an olefinic feed composed of a mixture of 50 vol. percent 2-butene and 50 vol. percent isobutylene was alkylated with isobutane, producing an alkylation reaction product having a clear research octane number of 98.8 and a clear motor octane number of 96.6. In Run 2, 2-butene and isobutylene were reacted separately with isobutane under process conditions otherwise identical to those in Run 1, and subsequently the alkylation reaction products produced by alkylation of the olefins separately were combined to provide an alkylation reaction product containing 50 vol. percent of the 2-butene-derived alkylate and 50 vol. percent of the isobutylene-derived alkylate. Analysis of the combined product showed a clear research octane number of only 98.7 and a clear motor octane number of only 96.2. In Run 3, isobutane was alkylated with an olefin feed containing 75 vol. percent isobutylene and 25 vol. percent 2-butene. The alkylation reaction product was found to have a clear research octane number of 98.7 and a mole ratio of trimethylpentanes to dimethylhexanes of 15.0. In Run 4, isobutane was alkylated separately with 2-butene and with isobutylene under alkylation conditions otherwise identical to those in Run 3 and a composite alkylation product containing 75 vol. percent isobutylene-derived alkylate and 25 vol. percent 2-butene-derived alkylate was prepared. The composite product was found to possess a clear research octane number of only 98.4 and a trimethylpentanes to dimethylhexanes mole ratio of only 13.5. The data of Table I, thus, clearly show that the product obtained from alkylation of a mixture of 2-butene and isobutylene is superior to that produced by separate alkylation of these isomers.

The 1-butene which is separated from 2-butene and isobutylene in the present process is passed into an alkylation zone and separately alkylated with an isoparaffin. Referring again to Table I, in Run 5, isobutane was alkylated with 1-butene, and, separately, with isobutylene. A composite alkylate product composed of 50 vol. percent of the 1-butene-derived alkylate and 50 vol. percent of the isobutylene-derived alkylate was made up. When this composite alkylate was analyzed, it was found to have a clear research octane number of 96.1 and a clear motor octane number of 94.1. In Run 6, an olefinic reactant composed of 50 vol. percent 1-butene and 50 vol. percent isobutylene was reacted with isobutane at alkylation conditions otherwise identical to those employed to produce the separate alkylates in Run 5. When the alkylate produced from the 1-butene-isobutylene mixture was analyzed, it was found to have a clear research octane number of only 94.8 and a clear motor octane number of only 93.1. The composite alkylate of Run 5 and the mixed butenes alkylate of Run 6 were further compared and the superiority of separately alkylating 1-butene and isobutylene was further demonstrated in that the mole ratio of trimethylpentanes to dimethylhexanes in the alkylate from Run 5 was found to be 5.4, while the mole ratio in the alkylate produced from the 1-butene-isobutylene mixture was found to be only 3.5. Thus, the beneficial effect of excluding 1-butene from the olefinic reactant employed in an alkylation process, and of alkylating 1-butene separately and combining the resulting alkylation reaction product with that derived from alkylation using 2-butene and isobutylene is clearly demonstrated.

I claim as my invention:

1. A process for producing an alkylation reaction product from an isoparaffinic reactant and an olefinic reactant mixture containing 1-butene, 2-butene and isobutylene, which process comprises the steps of:
   (a) contacting said olefinic reactant mixture with a solid sorbent to selectively adsorb said 1-butene, thus providing a raffinate mixture of 2-butene and isobutylene;
   (b) contacting at least a portion of said raffinate mixture with a first portion of said isoparaffinic reactant and with a first alkylation catalyst in a first alkylation zone at 2-butene-isobutylene alkylation conditions;
   (c) desorbing said 1-butene from said sorbent and contacting at least a portion of said desorbed 1-butene with a second portion of said isoparaffinic reactant and with a second alkylation catalyst in a second alkylation zone at 1-butene alkylation conditions; and,
   (d) recovering a first portion of said alkylation reaction product from the effluent from said first alkylation zone and recovering a second portion of said alkylation reaction product from the effluent from said second alkylation zone.

2. The process of claim 1 further characterized in that said isoparaffinic reactant is isobutane and said first and second alkylation catalysts are hydrogen fluoride catalyst.

3. The process of claim 1 further characterized in that said solid sorbent is a crystalline aluminosilicate selected from the group consisting of Type X and Type Y zeolites containing a cation selected from the group consisting of potassium and barium at cationic sites within the zeolite.

4. The process of claim 1 further characterized in that said raffinate mixture is substantially free from 1-butene.

5. The process of claim 1 further characterized in that said first alkylation catalyst is a 2-butene-isobutylene hydrogen fluoride alkylation catalyst and said second alkylation catalyst is a 1-butene hydrogen fluoride alkylation catalyst.

6. The process of claim 1 further characterized in that said first alkylation catalyst is identical with said second alkylation catalyst.

References Cited
UNITED STATES PATENTS

| | | | |
|---|---|---|---|
| 3,078,321 | 2/1963 | Van Pool et al. | 260—683.49 |
| 2,502,015 | 3/1950 | Matuszak | 260—683.49 |
| 2,594,343 | 4/1952 | Pines (I) | 260—683.49 |
| 2,820,074 | 1/1958 | Pines (II) | 260—683.49 |
| 3,331,882 | 7/1967 | Mattox | 260—677 A |

DELBERT E. GANTZ, Primary Examiner

G. J. CRASANAKIS, Assistant Examiner

U.S. Cl. X.R.

260—677 AD